(12) United States Patent
Kim et al.

(10) Patent No.: US 11,398,743 B2
(45) Date of Patent: Jul. 26, 2022

(54) APPARATUS AND METHOD FOR FORMING CURRENT PATH ACCORDING TO CHARGING OR DISCHARGING STATE OF BATTERY PACK

(71) Applicant: LG CHEM, LTD., Seoul (KR)

(72) Inventors: Se Min Kim, Daejeon (KR); Yong Min Jo, Daejeon (KR); Jun Young Bang, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 128 days.

(21) Appl. No.: 16/803,074

(22) Filed: Feb. 27, 2020

(65) Prior Publication Data
US 2020/0280206 A1    Sep. 3, 2020

(30) Foreign Application Priority Data
Feb. 28, 2019  (KR) ........................ 10-2019-0024013

(51) Int. Cl.
*H02J 7/00* (2006.01)

(52) U.S. Cl.
CPC ...... *H02J 7/007182* (2020.01); *H02J 7/0013* (2013.01); *H02J 7/0047* (2013.01)

(58) Field of Classification Search
USPC .................................................. 320/134–136
See application file for complete search history.

(56) References Cited

U.S. PATENT DOCUMENTS

| 7,675,263 | B2* | 3/2010 | Kawasumi | H02J 7/0031 320/112 |
| 9,184,615 | B2* | 11/2015 | Kim | H02J 7/0036 |
| 2005/0156574 | A1 | 7/2005 | Sato et al. | |
| 2009/0021217 | A1* | 1/2009 | Nakazawa | H01M 50/572 320/134 |
| 2009/0273314 | A1 | 11/2009 | Yoshikawa | |
| 2010/0072950 | A1* | 3/2010 | Tatebayashi | H02J 7/0021 320/134 |
| 2012/0153903 | A1 | 6/2012 | Kim et al. | |
| 2015/0091497 | A1* | 4/2015 | Leung | H02J 7/0029 320/107 |

FOREIGN PATENT DOCUMENTS

| JP | 4687743 B2 | 5/2011 |
| JP | 5405041 B2 | 2/2014 |
| KR | 10-1076953 B1 | 10/2011 |
| KR | 10-1294378 B1 | 8/2013 |
| KR | 10-1750415 B1 | 6/2017 |

* cited by examiner

*Primary Examiner* — Samuel Berhanu
(74) *Attorney, Agent, or Firm* — Morgan, Lewis & Bockius LLP

(57) ABSTRACT

A battery pack according to an embodiment of the present disclosure is connected to a rectifier, and is composed of a (+) terminal formed by connecting a plurality of (+) terminals of a plurality of battery modules, a (+) output terminal connected to a (+) input terminal of the rectifier, a BMS configured to control charging or discharging of the battery pack, and a current path forming unit disposed between the (+) terminal and the (+) output terminal and configured to form a current path between the (+) terminal and the (+) output terminal according to the control by the BMS.

8 Claims, 3 Drawing Sheets

APPARATUS AND METHOD FOR FORMING CURRENT PATH ACCORDING TO CHARGING OR DISCHARGING STATE OF BATTERY PACK

CROSS-REFERENCE TO RELATED APPLICATION

This application claims priority to Korean Patent Application No. 10-2019-0024013 filed on Feb. 28, 2019 and all the benefits accruing therefrom under 35 U.S.C. § 119, the contents of which are incorporated by reference in their entirety.

BACKGROUND

The present disclosure relates to an apparatus and method for forming a current path, which form a charging or discharging path of a battery pack according to a charging or discharging state of the battery pack.

A demand for using alternative energy or clean energy is increasing due to the rapid increase of using a fossil fuel, and as a part of this, the electricity generation and storage fields using electrochemistry is being actively studied.

At present, a battery is a representative example of an electrochemistry element using such electrochemical energy, and tends to be deployed widely for various areas.

Nowadays, as technology development and demands increase for a mobile device such as a mobile computer, a mobile phone, or a camera, demands for the battery as an energy source is rapidly increasing.

As a type of such a battery, a lead-acid battery has been widely used. However, in recently, a lithium battery of which energy density and capacity are enlarged is widely used.

The lead-acid battery or lithium battery is connected to an external load or a charging device through a rectifier.

In particular, when being charged, the existing lead-acid battery has large resistance of the battery itself, and thus the battery is not damaged, even when a charging current is not separately limited by the rectifier. However, for a lithium battery, since the internal resistance is very small, the battery may be damaged when a charging current is not accurately limited. And thus, it is difficult to directly apply the existing rectifier, which is used in connection with the lead-acid battery, to the lithium battery.

Accordingly, the present disclosure propose an apparatus and method capable of using a rectifier, which is used in connection with the lead-acid battery, in a lithium battery by forming a charging or current path differently according to a charging or discharge current value.

RELATED ART DOCUMENTS

Patent Document

Korean Patent Registration Publication No. KR 1750415 B1

SUMMARY

The present disclosure provides a battery pack in which a path of a current flowed in from a rectifier is differently formed according to a charging or discharge current value.

The present disclosure also provides a battery pack charged by limiting a current value flowed in from a rectifier when being charged.

In accordance with an exemplary embodiment, a battery pack, which is connected to a rectifier and composed of a plurality of battery modules, the battery pack includes: a (+) terminal formed by connecting a plurality of (+) terminals of the plurality of battery modules; a (+) output terminal connected to a (+) input terminal of the rectifier; a battery management system (BMS) configured to control charging or discharging of the battery pack; and a current path forming unit disposed between the (+) terminal and the (+) output terminal and configured to form a current path between the (+) terminal and the (+) output terminal according to the control by the BMS.

The current path forming unit may include a first FET; a second FET; and a current limiting module, wherein the first FET and the second FET are connected in series, and the current limiting module is connected to the first FET in parallel.

The current path forming unit may form any one of: a charging current path including the current limiting module and the second FET to be connected each other; and a discharge current path including the first FET and the second FET to be connected each other.

The BMS controls the current path forming unit and forms the charging current path when the battery pack is charged and forms any one of a first discharge current path or a second discharge current path when the battery pack is discharged.

The BMS may: measure an output voltage value of the rectifier, an output voltage value of the battery pack, and a discharge current value of the battery pack; compares the output voltage value of the rectifier with the output voltage value of the battery pack; form the charging current path between the (+) terminal and the (+) output terminal by turning off the first FET and by turning on the second FET, when the output voltage value of the rectifier is larger than the output voltage value of the battery pack according to the comparison result; and compare the output voltage value of the rectifier with the output voltage value of the battery pack, and a discharge current value of the battery pack with a prescribed first reference current value, and select a discharge path by controlling on or off of the first and second FETs and the current limiting module according to the current value comparison result, when the output voltage value of the rectifier is smaller than the output voltage value of the battery pack according to the comparison result.

The selecting of the discharge path may include: forming a first discharge current path including the second FET and a body diode of the first FET by turning on the second FET and turning off the current limiting module and the first FET, when the measured discharge current value of the battery pack is smaller than the prescribed first reference current value according to the current value comparison result; and forming a second discharge current path including source-drain paths of the first FET and the second FET by turning off the current limiting module and turning on the first FET and the second FET, when, as the current value comparison result, the measure discharge current value of the battery pack is equal to or larger than the prescribed first reference current value.

The current limiting module may limit a charging current to be applied from the rectifier to the battery module so that a value of a current flowing from the rectifier to the battery module does not exceed a preset prescribed allowance charging current value of the battery pack.

In accordance with another exemplary embodiment, a current control method of a battery pack includes: a voltage measurement step for measuring, by a BMS in a battery pack, an output voltage of a battery pack and an output voltage of a rectifier; and a voltage comparison step for comparing the output voltage of the battery pack with the output voltage of the rectifier, which are measured by the BMS, wherein, when the output voltage of the rectifier is larger than the output value of the battery pack according to a voltage comparison result, the BMS performs a charging current path forming step for determining as a charging state and controlling a current path forming unit to form a path of a charging current flowing from the rectifier to a battery module, and, when the output voltage of the battery pack is larger than the output value of the rectifier according to the voltage comparison result, the BMS performs a discharge current path for determining as a discharge state and controlling the current path forming unit to form a path of a discharge current flowing from the battery module to the rectifier, which is different from the path of the charging current.

In the charging current path forming step, a first FET may be turned off, a current limiting module and a second FET may be turned on, the charging current path may be formed including the current limiting module and the second FET connected to each other, and thus a current flowing from the rectifier to the battery module may be limited under a prescribed allowance charging current value of the battery module.

In the discharge current path forming step, the current limiting module may be turned off, and the BMS may: perform a battery pack discharge current measuring step for measuring a discharge current of the battery pack, and a current comparison step for comparing the measured discharge current of the battery pack with a prescribed allowance discharge current; form a first discharge current path including a body diode of a first FET and a second FET by turning off the first FET, when the measured discharge current of the battery pack is smaller than the prescribed first reference current value according to the comparison result from the current comparison step, and form a second discharge current path including source-drain paths of the first FET and a second FET by turning on the second FET, when the measured discharge current of the battery pack is the prescribed first reference current value or larger according to the comparison result from the current comparison step.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
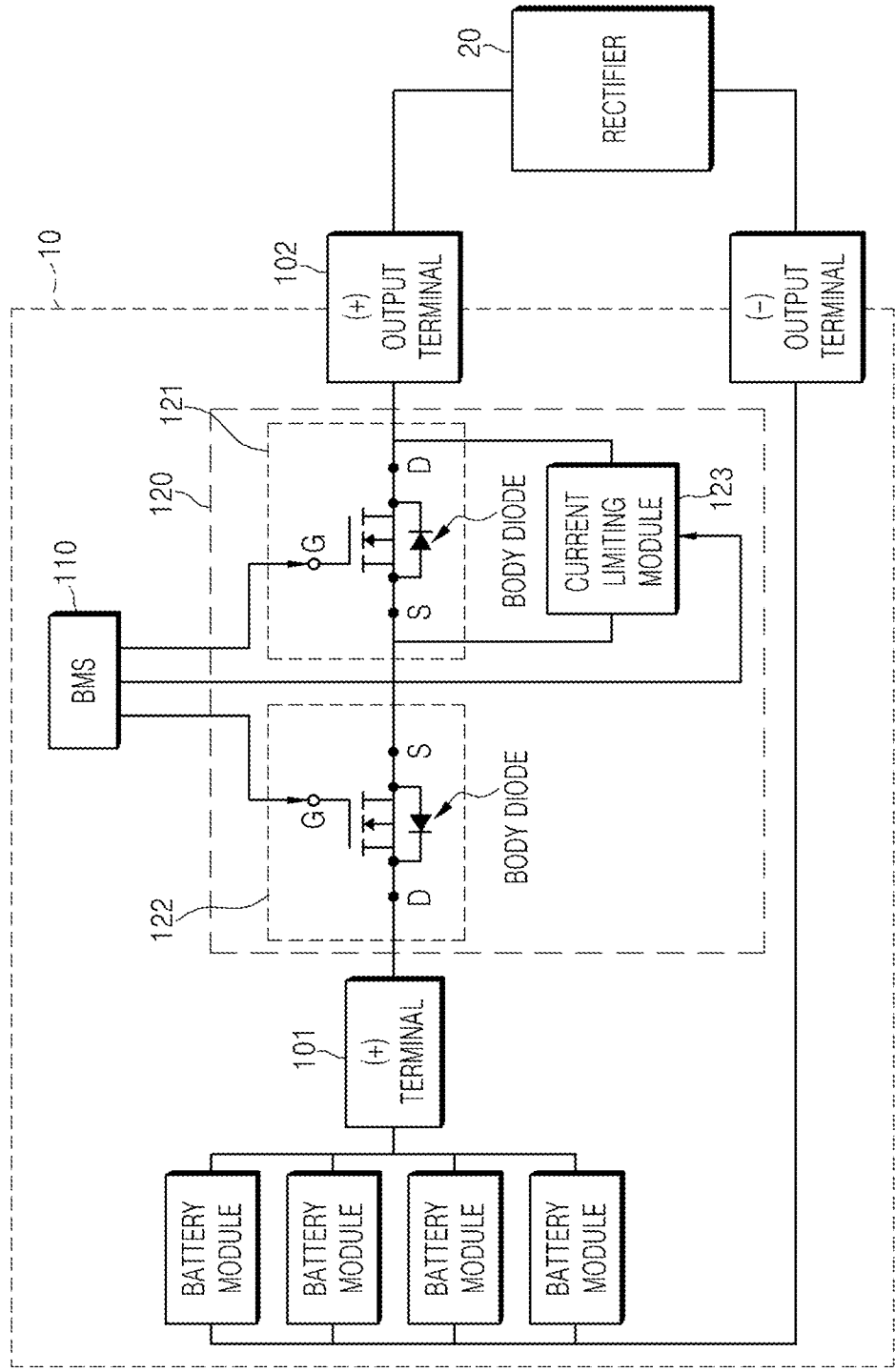
FIG. 1 is a figure illustrating a battery pack with a current limiting function according to an embodiment of the present disclosure.

Hereinafter, embodiments of the present disclosure will be described in detail with reference to the accompanying drawings so that the present disclosure can be easily realized by those skilled in the art. The present disclosure can be practiced in various ways and is not limited to the embodiments described herein. In the drawings, parts which are not related to the description are omitted to clearly set forth the present invention and similar elements are denoted by similar reference symbols throughout the specification.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. The terminology used herein is used for the purpose of describing particular example embodiments only and is not intended to be limiting. As used herein, the singular forms "a," "an," and "the" may be intended to include the plural forms as well, unless the context clearly indicates otherwise.

In addition, if certain parts are described as being "connected" to other parts, they are not only "directly connected" to the other parts, but also "indirectly connected" to the other parts with any other device intervened therebetween. In addition, when an element is referred to as "comprising" or "including" a component, it does not preclude another component but may further include the other component unless the context clearly indicates otherwise. Through the whole document of the present disclosure, the term "step of" does not mean "step for".

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant. In this case, the meanings of the arbitrarily selected terminologies shall be defined in the relevant part of the detailed description. Accordingly, the specific terms used herein should be understood based on the unique meanings thereof and the whole context of the present invention.

1. Battery Pack with a Current Limiting Function According to an Embodiment of the Present Disclosure A lithium battery pack with a current limiting function according to an embodiment of the present disclosure may be composed of a plurality of battery modules.

In detail, the lithium battery pack 10 with the current limiting function according to an embodiment of the present disclosure may be used in connection with a rectifier 20.

FIG. 1 is a figure illustrating the battery pack with the current limiting function according to an embodiment of the present disclosure.

Hereinafter, the battery pack with the current limiting function according to an embodiment of the present disclosure will be described with reference to FIG. 1.

The rectifier 20 in the present disclosure means a typical rectifier, and may be an element connected to an output terminal of the battery pack and for stabilizing an output voltage and current of the battery pack or a charging voltage and current from an external charger.

The battery pack 10 may be composed of a (+) terminal 101 connected to (+) terminals of the plurality of battery modules, a (+) output terminal 102 connected to a (+) input terminal of the rectifier, a battery management system (BMS) 110 for controlling charging or discharging of the battery pack, and a current path forming unit 120 for forming a current path between the (+) terminal 101 and the (+) output terminal 102 according to a control by the BMS 110.

The current path forming unit 120 may be composed of a first field effect transistor (FET) 121, a second FFT 12, and a current limiting module 123.

In detail, the first and second FETs 121 and 122 of the current path formation unit are connected in series, but one terminal of the first FET 121 is connected to the (+) output terminal 102, and another terminal is connected to one terminal of the second FET 122. Another terminal of the second FET 122 is connected to the (+) terminal 101.

The current limiting module 123 may be connected in parallel with the first FET 121.

When the battery pack is charged, the current path formation unit 120 may form a charging current path of a charging current between the (+) terminal and the (+) output terminal. When the battery pack is discharged, the current path formation unit 120 may form a discharge current path between the (+) terminal and the (+) output terminal, which is different from the charging current path.

The charging current path may be a current path including the current limiting module 123 and the second FET 122.

The discharging current path may be a discharging current path including the first FFT 121 and the second FET 122.

The BMS 110 may measure an output voltage value of the rectifier 20, an output voltage value of the battery pack 10, and a discharge current value of the battery pack 10, and compare the output voltage value of the rectifier 20 with the output voltage value of the battery pack 10.

The output voltage of the battery pack 10 may be a voltage obtained by measuring a voltage between the (+) output terminal and (−) output terminal, and an output voltage of the rectifier 20 may be a voltage between the (+) input terminal of the rectifier 20 and a ground terminal of a load (or a charger) connected to the rectifier 20.

The BMS 110 may compare the output voltage value of the rectifier 20 with the output voltage value of the battery pack 10, and form the charging current path between the (+) terminal 101 and (+) output terminal 102 by turning off the first FET 121 and turning on the current limiting module 123 and the second FET 122, when, as the comparison result, the output voltage value of the rectifier 20 is larger than the output voltage value of the battery pack 10.

In other words, the charging current path is formed as a current path connected in order of the rectifier 20->the (+) output terminal 102->the current limiting module 123->the second FET 122->the (+) terminal 101->the battery module 10 by turning on the current limiting module 123 and the second FET 122 on the charging current path.

The charging current path may limit a current flowing from the rectifier to the battery modules to under a prescribed value using the current limiting module 123.

In other words, the current limiting module 123 limits a part of the flow of the current flowing from the rectifier to the battery modules, and thus the battery modules may be safely charged with under a prescribed current value.

Meanwhile, the current limiting module 123 of the present disclosure may be composed of a current limitation element disclosed already. For example, the current limitation element may be set so that the current smaller than a prescribed current value is flowed, and thus, even when a current larger than the prescribed current value is input, the output of the current limitation element may be output under the prescribed current value. In other words, the current limiting module may prevent a charging current applied to the battery modules from flowing at or above the prescribed current value.

In the current limiting module 123, a plurality of current limiting modules connected in parallel may be adopted according to a prescribed allowance charging current acceptable in the battery pack 10.

For example, when the prescribed allowance charging current value of an arbitrary battery pack is 20 A, the current limiting module may be implemented with one 20 A current limiting module capable of outputting the current of maximum 20 A.

In addition, when the prescribed allowance charging current value of another battery pack is 40 A, the current limiting module 123 may be implemented by connecting two 20 A current limiting modules in parallel.

Since each of the two current limiting modules connected in parallel is able to pass a 20 A current, the charging current allowed by the entire current limiting module may be 40 A.

When the output voltage of the rectifier 20 is smaller than the output voltage of the battery pack 10 (when the battery pack is in a discharged state), the BMS 110 measures a discharge current of the battery pack 10, compares the measured discharge current value with a prescribed first reference current value, and forms the discharge current path as any one between a first discharge current path and a second discharge current path.

Each of the first and second FETs 121 and 122 may include a body diode generated therein in a FET manufacturing process. In detail, an n-type FET is p-n junctioned between the body and the drain, and has the same effect as a diode. However, a source terminal of a FET is typically connected to a body terminal, and consequently, the FET has the structure in which the source terminal and a drain terminal are connected by the body diode. In other word, a diode illustrated typically in a symbol of an FET circuit is the body diode.

The first reference current value may be the same as or lower than a current value allowable to the body diode formed inside a FET. For example, the first reference current value may be set as a value within 30% of a maximum available current value of the body diode formed inside according to an FET type.

When the measured discharge current of the battery pack 10 is smaller than the prescribed first reference current value, the BMS 110 may form the first discharge current path through the second FET 122 and a body diode path of the first FET 121 and by turning off the current limiting module 123 and the first FET 121, and turning on the second FET 122.

In other words, the first discharge current path is a current path formed in order of the battery modules->the (+) terminal 101->the second FET 122->the body diode of the first FET->the (+) output terminal 102->the rectifier 20.

When the measured discharge current of the battery pack 10 is equal or larger than the prescribed first reference current value, the BMS 110 may form the second discharge current path connected by including source-drain paths of the first FET 121 and the second FET 122 by turning off the current limiting module 123, and turning on the first FET 121 and the second FET 122.

In other words, the second discharge current path is a current path formed in order of the battery modules->the source-drain path of the second FET 122->the first FET 121->the (+) output terminal 102->the rectifier 20.

Meanwhile, a battery pack according to another embodiment of the present disclosure may use a time during which the current flows in addition to a current value as a criterion for determining the first discharge current path and the second discharge current path in the battery pack 10 of the present disclosure.

For example, when the output current of the battery pack 10 is the prescribed first reference current value or larger and a discharge time of the battery pack 10 is shorter than a prescribed first reference time, the current limiting module 123 and the first FET 121 are turned off and the second FET 122 is turned on, and thus the first discharge current path may be formed including the second FET 122 and the body diode of the first FET 121.

When the output current of the battery pack 10 is the prescribed first reference current value or larger and the discharge time of the battery pack 10 is the prescribed first reference time or longer, the current limiting module 123 is turned off, the first FET 121 and the second FET 122 are turned on, and thus the second discharge current path may be formed including the source-drain paths of the FET 121 and the second FET 122. The reason why the discharge current paths are made different is as follows, when the battery pack 10 is being discharged. When the discharge current is smaller than the prescribed first current value, the discharge current is within a current range sufficiently allowable by the first FET 121 even when the discharging is performed only through the current path (the first discharge current path) through the body diode of the first FET 121. Accordingly, the FFT 121 is not damaged. However, when the discharge current becomes larger, the discharge current is out of the allowable current range allowable by the body diode and the FET 121 is damaged. In this case, the FET may be protected by turning on the second FET 122 and diverting the current, which flows through the body diode of the second FET 122, to flow through the source-drain path of the second FET 122.

When the first discharge current path is formed by including the body diode of the first FET 121, there is an advantage in that a discharge path is formed even for a transient discharge and discharge may be rapidly performed. In detail, when the first discharge current path does not exist, the BMS 110 determines that the discharge current of the battery pack 10 is a prescribed value or larger, confirms that the discharge current is the prescribed current value or larger, and then turns on the first FET 121. Therefore, a prescribed time is taken to make the first FET 121 operate, and thus fast discharge is not performed. However, when the first discharge path exists, a discharging current is cut off by means of the body diode of the first FET 121 at the time of charging the battery pack 10 and the discharge current may be immediately discharged at time of discharging the battery pack 10.

Meanwhile, in the battery pack 10 according to an embodiment of the present disclosure, the BMS 110 is described to control the first and second FETs 121 and 122 and the current limiting module 123 directly, but the present disclosure is not limited thereto.

For example, the current path forming unit 120 is composed of a separate micro control unit (MCU), and the BMS 110 may transmit a signal for turning on or off the first and second FETs 121 and 122 and the current limiting module 123, and control on or off of the first and second FETs 121 and 122 and the current limiting module 123 according to the received signal from the BMS 110.

In other words, it may be implemented such that the BMS 110 does not directly control the first and second FETs 121 and 122 and the current limiting module 123, but the MCU controls.

Figure 2:
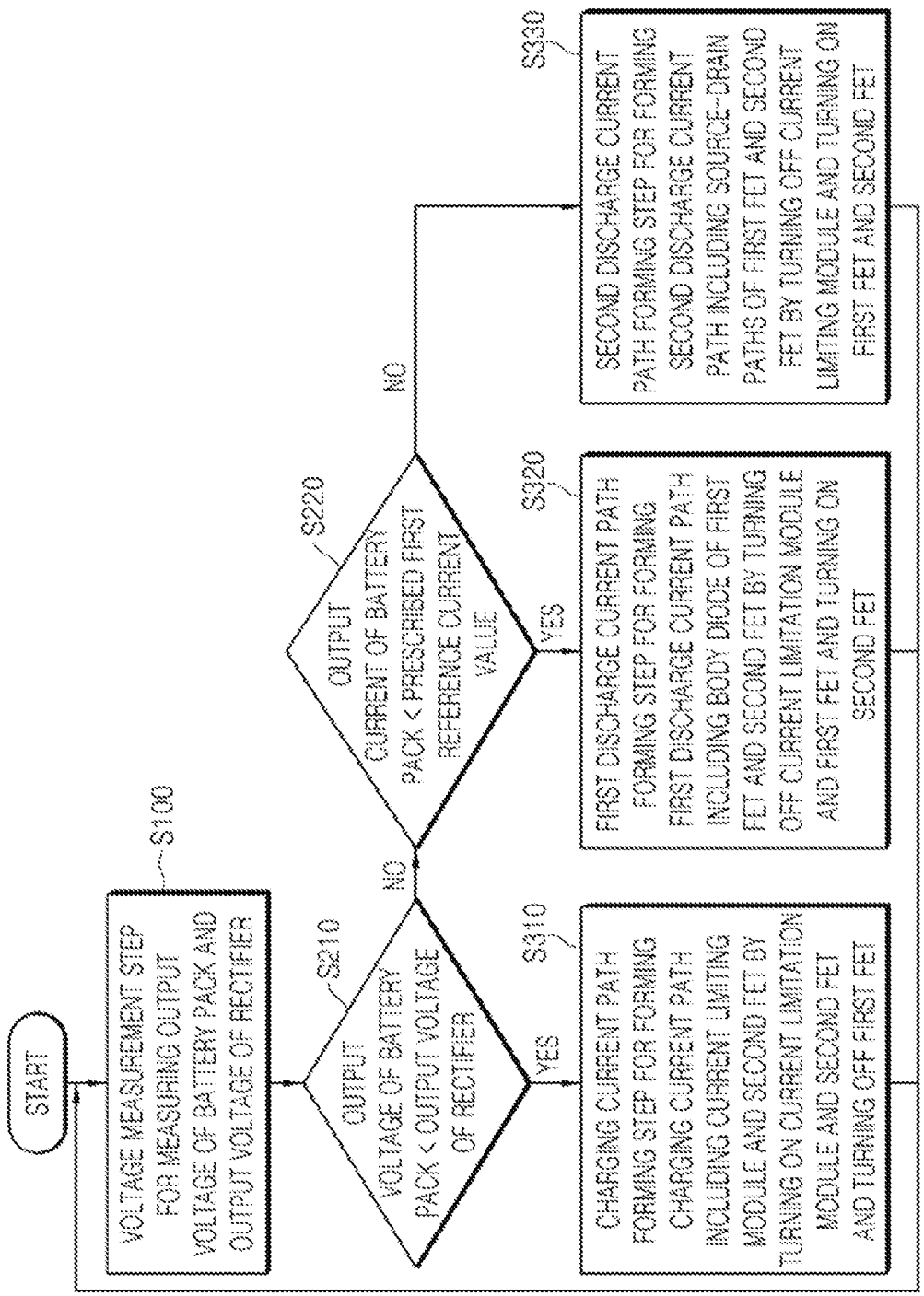
FIG. 2 is a flowchart showing a current control method for a battery pack according an embodiment of the present disclosure.

2. Current Control Method for a Battery Pack According to an Embodiment of the Present Disclosure FIG. 2 is a flowchart showing a current control method for a battery pack according an embodiment of the present disclosure.

Hereinafter, the current control method for the batter pack according to the other embodiment of the present disclosure will be described with reference to FIG. 2.

The control method for the battery pack includes a voltage measurement step S100 for measuring, by the BMS of the battery pack, an output voltage of the battery pack and an output voltage of a rectifier, and a voltage comparison step S210 for comparing the output voltage of the battery pack and the output voltage of the rectifier, which has been measured in the BMS. As the voltage comparison result, when the output voltage of the rectifier is larger than the output voltage of the battery pack, the BMS may perform a charging current path forming step S310 for controlling the current path forming unit to form a charging current path through which a charging current flows from the rectifier to the battery modules.

As the voltage comparison result, when the output voltage of the battery pack is larger than the output voltage of the rectifier (when the battery pack is in a discharge state), the BMS may control the current path forming unit to perform a discharge current path forming steps S320 and S330 for forming the discharge current path which is different from the charging current path and through which a discharge current flows from the battery modules to the rectifier.

In the charging current path forming step S310, the charging current path is formed such that the charging current, which flows from the rectifier 20 to the current limiting module 123, is made to flow through the current limiting module 123, and thus the current flowing from the rectifier to the battery module is limited to under a prescribed allowable charging current value.

In other words, in the charging current path forming step S310, the current limiting module and the second FET are turned on to form the current path connected in order of the rectifier->the (+) output terminal->the current limiting module->the second FET->the (+) terminal->the battery modules, and thus the charging current flowing from the rectifier to the battery modules is made to pass through the current limiting module only under the prescribed allowable charging current value.

The prescribed allowable charging current value may be equal to a maximum charging current value that the battery module is capable of being charged safely or smaller than the maximum charging current value.

The current limiting module 123 of the present disclosure may be composed of a current limitation element disclosed already. For example, the current limitation element is set so that only a current smaller than a prescribed current value is flowed therethrough, and thus, even when a current larger than the prescribed current value is input, the output of the current limitation element may be under the prescribed current value.

In other words, the current limiting module 123 may prevent the charging current above a prescribed allowable current value from flowing.

In addition, in the current limiting module 123, a plurality of current limiting modules may be connected in parallel according to the prescribed allowable charging current preset in the battery pack 10.

For example, when the prescribed allowance charging current value of the battery pack is 20 A, the current limiting module 123 may be implemented with a single 20 A current limiting module.

In addition, when the prescribed allowance charging current value of another battery pack is 40 A, the current limiting module 123 may be implement by connecting two 20 A current limiting modules in parallel.

The discharge current path forming steps S320 and S330 may include a battery pack discharge current measuring step for measuring the discharge current of the battery pack and a current comparison step S220 for comparing the measured discharge current with a prescribed first reference current determined by a diode.

As the comparison result of the current comparison step S220, when the measured discharge current of the battery pack is smaller than the prescribed first reference current, the current limiting module and the first FET in the current path forming unit are turned off and the second FET 122 is turned on. Accordingly, the first discharge current path may be formed S320 which includes the body diode path of the first FET 121 and the second FET 122.

As the comparison result of the current comparison step S220, when the measured discharge current of the battery pack 10 is the prescribed first reference current or larger, the current limiting module 123 in the current path forming unit is turned off, and the first and second FET 121 and 122 are turned on. Accordingly, the second discharge current path may be formed S330 which includes the source-drain paths of the first FET 121 and the second FET 122.

Here, the prescribed first current value may be equal to or lower than a current value allowable to the body diode formed inside the FET. For example, the first reference current value may be set as a value within 30% of the maximum available current value of the body diode formed inside the FFT according to an FET type.

The reason why the current paths are made different is as follows, when the battery pack is being discharged. When the discharge current is smaller than the prescribed prescribed first current value, the body diode is within a sufficiently allowable current range, even when the discharge is performed only through the current path (first discharge current path) through the body diode of the first FET, which does not cause damage in the FET. However, when the discharge current becomes larger, the body diode is out of the allowable current range and the FET is damaged. In this case, the FET may be protected by turning on the second FET and diverting the current, which flows through the body diode of the second FET, to flow through the source-drain path of the second FET.

In other words, the prescribed first reference current value of the discharge current, which determines the discharge current path, may be smaller than the current range allowable by the body diode of the first FET.

When the first discharge current path is formed by including the body diode of the first FET, a discharge path is formed even in a transient discharge and discharge may be rapidly performed. In detail, when the first discharge current path does not exist, the BMS 110 determines whether the battery pack is being charged or discharged, and turns on the first FET only when the discharging is confirmed. Therefore, a prescribed time is taken to make the first FET operate and thus fast discharge is not performed. However, when the first discharge path exists, a charging current is cut off by means of the body diode of the first FET when charging the battery pack and the discharge current may be immediately discharged when discharging the battery pack.

Figure 3:
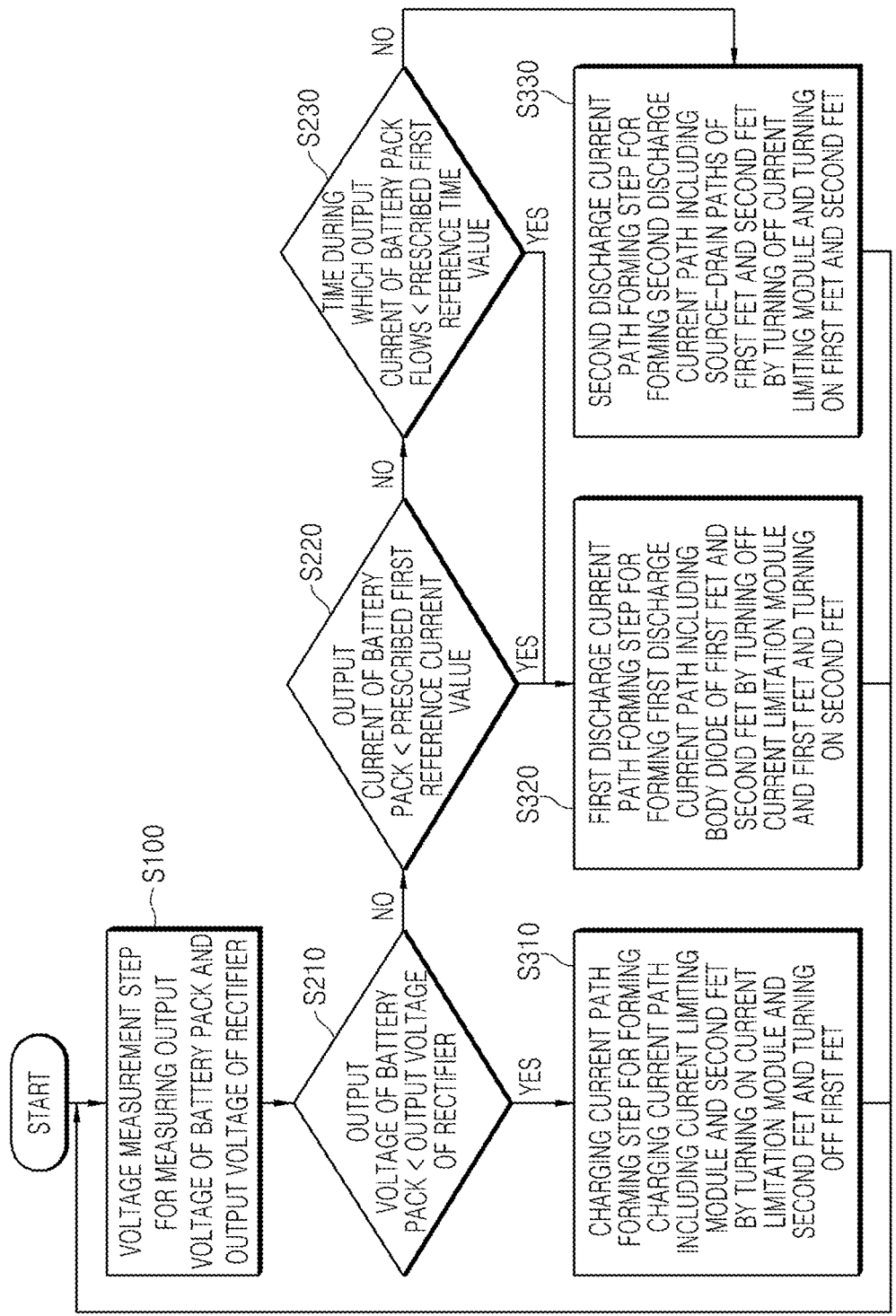
FIG. 3 is a flow chart showing a current control method for a batter pack according to another embodiment of the present disclosure.

FIG. 3 is a flow chart showing a current control method for a batter pack according to another embodiment of the present disclosure.

A current control method of the battery pack according to the other embodiment of the present disclosure further includes a discharge time measuring step for measuring a time during which the discharge current flows, in addition to the current value that is the criterion for determining the first discharge current path or the second discharge current path in the current path forming step of the battery pack, which is described above.

For example, when the current is the prescribed first reference current value or larger, and the time during which the current flows in the discharge direction is shorter than a prescribed first reference time, the current limiting module 123 and the first FET 121 are turned off, and the second FET 122 is turned on. Accordingly, the first discharge current path through the body diode path of the first FET 121 and the second FET 122 may be formed.

When the current is the prescribed first reference current value or larger, and the time during which the current flows in the discharge direction is the prescribed first reference time or longer, the current limiting module 123 is turned off, and the first FET 121 and the second FET 122 are turned on. Accordingly, the second discharge current path through the drain-source paths of the first FET 121 and the second FET 122 may be formed.

According to the present disclosure, a path of a charging current flowed in from a rectifier having been used in an existing lead-ion battery is differently formed from a path of a discharge current, and thus the rectifier may also be used in a lithium battery.

In addition, the present disclosure includes a current limiting module for limiting a current to under a prescribed value on a path of a charging current for charging a lithium battery pack, and thus the lithium battery pack may be charged safely.

In addition, according to the present invention, the current limiting module mounted in a lithium battery may be extended (added) to be applied to lithium battery packs with various capacities.

The present disclosure has been described using preferred embodiments. However, it is to be understood that the scope of the present disclosure is not limited to the disclosed embodiments. In addition, it should be understood that all changes or modifications derived from the definitions and scopes of the Claims and their equivalents fall within the scope of the present invention.

What is claimed is:

1. A battery pack, which is connected to a rectifier and comprises a plurality of battery modules, the battery pack comprising:
   a (+) terminal formed by connecting a plurality of (+) terminals of the plurality of battery modules, the plurality of battery modules being directly electrically connected in parallel to the (+) terminal;
   a (+) output terminal connected to a (+) input terminal of the rectifier;
   a battery management system (BMS) configured to control charging or discharging of the battery pack; and
   a current path forming unit disposed between the (+) terminal and the (+) output terminal, the current path forming unit being configured to form a current path between the (+) terminal and the (+) output terminal according to the control by the BMS, wherein the BMS is further configured to control the current path forming unit based on an output voltage value of the rectifier, wherein the current path forming unit comprises:
- a first field effect transistor (FET);
- a second FET; and
- a current limiting module, wherein the first FET and the second FET are connected in series, wherein the current limiting module is connected to the first FET in parallel, and wherein the (+) terminal is directly electrically connected to the second FET.

2. The battery pack of claim 1, wherein the current path forming unit is further configured to form any one of:
- a charging current path comprising the current limiting module and the second FET to be connected to each other; and
- a discharge current path comprising the first FET and the second FET to be connected to each other.

3. The battery pack of claim 2, wherein the BMS is further configured to:
- form the charging current path when the battery pack is charged; and
- form any one of a first discharge current path or a second discharge current path when the battery pack is discharged.

4. The battery pack of claim 2, wherein the BMS is further configured to:
measure:
- an output voltage value of the rectifier;
- an output voltage value of the battery pack; and
- a discharge current value of the battery pack;

compare the output voltage value with the output voltage value of the battery pack;

form the charging current path between the (+) terminal and the (+) output terminal by turning off the first FET and by turning on the second FET, when the output voltage value of the rectifier is larger than the output voltage value of the battery pack according to the comparison result; and compare the output voltage value of the rectifier with the output voltage value of the battery pack, and a discharge current value of the battery pack with a prescribed first reference current value, and select a discharge path by controlling on or off of the first and second FETs and the current limiting module according to the current value comparison result, when the output voltage value of the rectifier is smaller than the output voltage value of the battery pack according to the comparison result.

5. The battery pack of claim 4, wherein the selecting of the discharge path comprises:
- forming a first discharge current path comprising the second FET and a body diode of the first FET by turning on the second FET and turning off the current limiting module and the first FET, when the measured discharge current value of the battery pack is smaller than the prescribed first reference current value according to the current value comparison result; and
- forming a second discharge current path comprising source-drain paths of the first FET and the second FET by turning off the current limiting module and turning on the first FET and the second FET, when, as the current value comparison result, the measure discharge current value of the battery pack is equal to or larger than the prescribed first reference current value.

6. The battery pack of claim 1, wherein the current limiting module is further configured to limit a charging current to be applied from the rectifier to the battery module so that a value of a current flowing from the rectifier to the battery module does not exceed a preset prescribed allowance charging current value of the battery pack.

7. A current control method of a battery pack, the method comprising:
- a voltage measurement step for measuring, by a battery management system (BMS) in a battery pack, an output voltage of a battery pack and an output voltage of a rectifier, the voltage of the battery pack being based on a plurality of battery modules directly electrically connected in parallel to a (+) terminal; and
- a voltage comparison step for comparing the output voltage of the battery pack with the output voltage of the rectifier, which are measured by the BMS, wherein, when the output voltage of the rectifier is larger than the output value of the battery pack according to a voltage comparison result, the BMS performs a charging current path forming step for determining as a charging state and controlling a current path forming unit to form a path of a charging current flowing from the rectifier to a battery module, the current path being between the (+) terminal and a (+) output terminal, the (+) output terminal being connected to a (+) input terminal of the rectifier, wherein, when the output voltage of the battery pack is larger than the output value of the rectifier according to the voltage comparison result, the BMS performs a discharge current path for determining as a discharge state and controlling the current path forming unit to form a path of a discharge current flowing from the battery module to the rectifier, which is different from the path of the charging current, wherein the BMS controls the current path forming unit based on an output voltage value of the rectifier, and wherein, in the charging current path forming step:
- a first field effect transistor (FET) is turned off;
- a current limiting module and a second FET are turned on, the second FET being directly electrically connected to the (+) terminal;
- the charging current path is formed comprising the current limiting module and the second FET connected to each other; and
- a current flowing from the rectifier to the battery module is limited under a prescribed allowance charging current value of the battery module.

8. The current control method of a battery pack of claim 7, wherein, in the discharge current path forming step:
the current limiting module is turned off; and
the BMS:
- performs a battery pack discharge current measuring step for measuring a discharge current of the battery pack; and
- performs a current comparison step for comparing the measured discharge current of the battery pack with a prescribed allowance discharge current;
- forms a first discharge current path comprising a body diode of the first FET and the second FET by turning off the first FET, when the measured discharge current of the battery pack is smaller than the prescribed first reference current value according to the comparison result from the current comparison step; and
- forms a second discharge current path comprising source-drain paths of the first FET and the second FET by turning on the second FET, when the measured discharge current of the battery pack is the prescribed first reference current value or larger according to the comparison result from the current comparison step.

* * * * *